Oct. 24, 1933. J. E. HILL 1,931,697
KITCHEN IMPLEMENT
Original Filed July 3, 1931
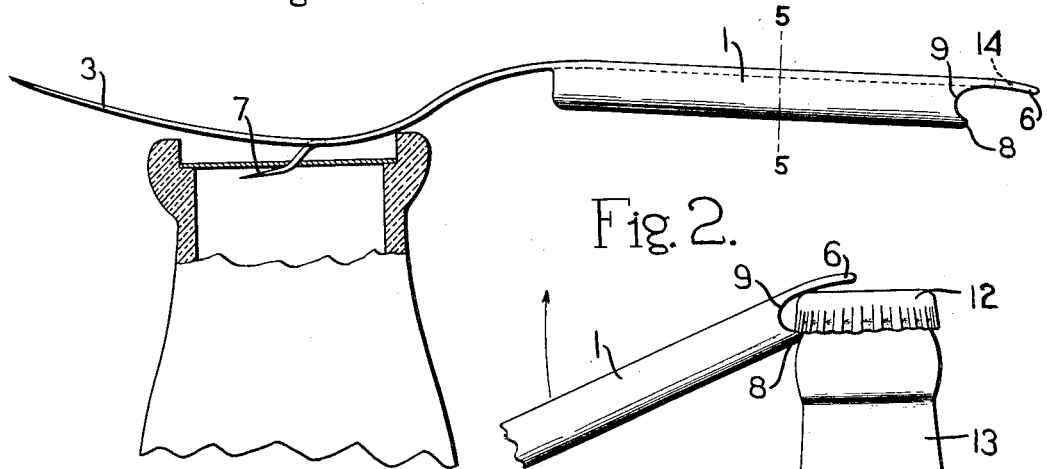
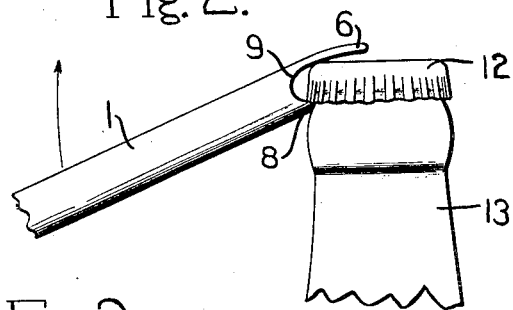
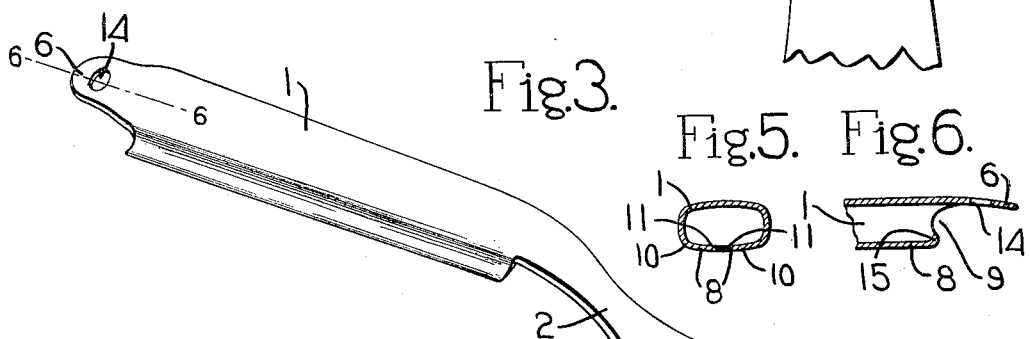
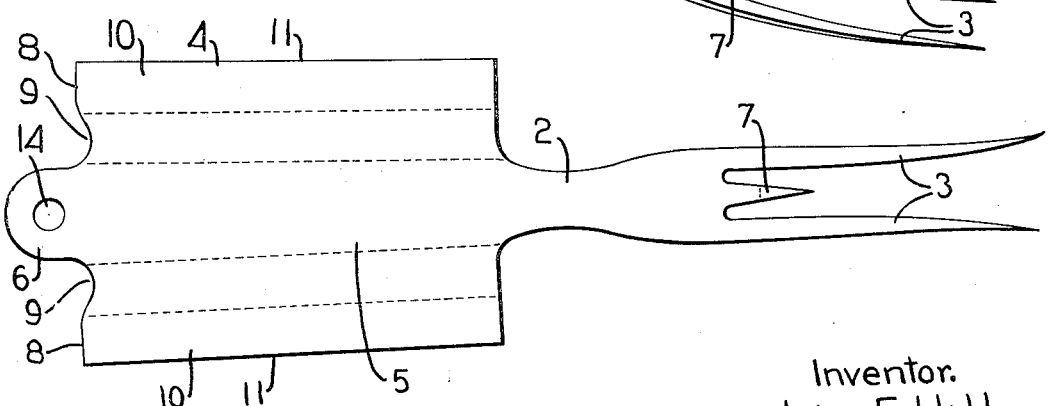
Inventor.
John E. Hill
by Heard Smith Ormand
Attys.

Patented Oct. 24, 1933

1,931,697

UNITED STATES PATENT OFFICE 1,931,697

KITCHEN IMPLEMENT

John E. Hill, Winchester, Mass.

Application July 3, 1931, Serial No. 548,514
Renewed March 14, 1933

1 Claim. (Cl. 65—47)

This invention relates to a kitchen implement and has for its object to provide a kitchen implement which is simple and inexpensive to manufacture and which can be used for removing the crown seal from bottles, for removing paper caps from milk bottles or as an ordinary vegetable fork.

In order to give an understanding of the invention I have illustrated in the drawing a selected embodiment thereof which will now be described after which the novel features will be pointed out in the appended claim.

In the drawing, Fig. 1 is a view partly in section showing my improved implement as used for removing the paper caps from milk bottles;

Fig. 2 shows the device as used for removing the crown seal from bottles;

Fig. 3 is a perspective view of the implement;

Fig. 4 illustrates the sheet metal blank from which the implement is formed;

Fig. 5 is a section on the line 5—5, Fig. 1;

Fig. 6 is a section on the line 6—6, Fig. 3;

My improved implement has somewhat the characteristics of a fork in that it is provided with a handle 1 and a shank portion 2 extending from the handle and two relatively long tines 3 which are curved in the direction of their length. The device is made from a single sheet metal blank which is bent into the shape of the completed article. This blank is shown at 4 in Fig. 4 and it comprises the relatively wide body portion 5 from one end of which projects the rounded extension 6 and from the other end of which projects the shank portion 2 and the tines 3. The tines 3 are widely separated and the blank is formed with a relatively short spur 7 situated between the tines at the base thereof. The rear edge of the blank 5, which is the left hand edge of Fig. 4, is formed with the curved recesses 9 on each side of the extension 6 and with the straight edge portion 8 extending from each recess 9 to the side edge of the blank.

In making the complete article the wing portions 10 of the blank are bent around underneath the central portion of the body until the edges 11 meet each other thereby forming the hollow handle 1 of the implement. These meeting edges 11 will preferably be secured together in some suitable way as by means of soldering, brazing, welding, etc. At the same time the shank 2 and the tines 3 are bent slightly to give them the curved shape shown in Figs. 1 and 2 and which is desirable in a vegetable fork. At the same time the spur 7 is bent downwardly from the plane of the tines into the relative position shown in Fig. 1 thereby to form a milk-bottle-cap-removing spur which is situated on the back side of the fork.

When the handle 1 is formed by bending the wings 10 around so that the edges 11 meet each other the recesses 9 come at the sides of the handle so that the end of the handle portion 1 has the shape best seen in Figs. 1 and 2. This end of the handle is designed for removing the crown seal cap 12 from a bottle 13 as shown in Fig. 2 and hence the body 5 of the blank is so designed that when the handle 1 is made by folding the wings 10 over the aligned edges 8 form a toe portion which is spaced from the extension 6 a sufficient distance so that the marginal portion of the crown seal cap 12 may be inserted between the edges 8 and the extension 6 as shown in Fig. 2. When the implement is applied to the bottle cap as shown in Fig. 2 an upward swinging movement of the implement in the direction of the arrow will serve to pry the cap 12 off from the bottle 13. When the device is to be used for removing the milk bottle cap as shown in Fig. 1, the spur 7 will be forced through the milk bottle cap thereby placing the implement in position on the top of the bottle with the convex face of the tines resting on the bottle top. A fulcruming motion of the ties on the bottle top will result in lifting the cap from the bottle.

It will be noted that the tines 3 are relatively widely spaced apart. This not only makes the implement one of special advantage for use as a vegetable fork because the use of only two tines and the relatively wide spacing of the tines enables one to handle a cooked vegetable without danger of breaking it apart, but it also provides space between the tines to receive the milk-bottle-cap-removing spur 7.

The extension 6 of the handle will preferably be provided with an aperture 14 to provide means for hanging the device on a nail or hook.

I claim:

A kitchen implement having a handle portion, a shank portion, two relatively long tines extending from the shank and curved in the direction of their length with the convex face on the back side of the implement and a spur extending from the back face of the implement at the base of the tines, said spur and tines having such relation that when the spur is positioned to penetrate a milk bottle cap the tines will extend entirely across the top of the milk bottle with the convex face engaging said top, whereby the cap may be removed by a fulcruming movement of the tines on the bottle.

JOHN E. HILL.